C. E. SEARCH.
DYNAMO ELECTRIC MACHINE.
APPLICATION FILED OCT. 4, 1911.
1,201,512.
Patented Oct. 17, 1916.
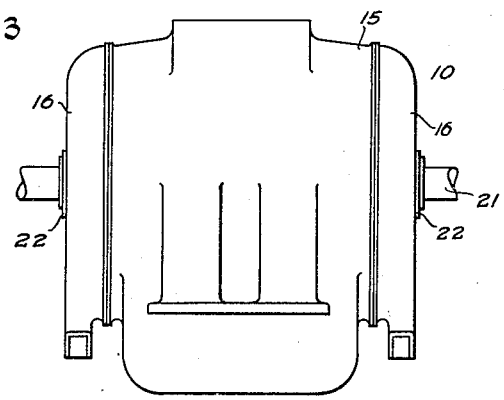
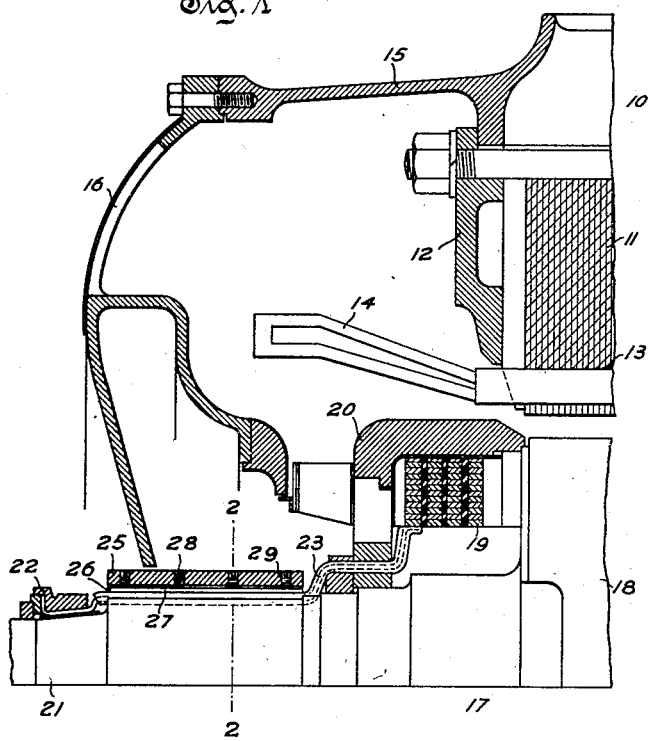
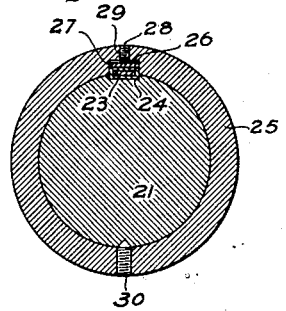

UNITED STATES PATENT OFFICE.

CHARLES E. SEARCH, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

DYNAMO-ELECTRIC MACHINE.

1,201,512.  Specification of Letters Patent.  Patented Oct. 17, 1916.

Application filed October 4, 1911. Serial No. 652,797.

*To all whom it may concern:*

Be it known that I, CHARLES E. SEARCH, a citizen of the United States, residing at Milwaukee, in the county of Milwaukee and State of Wisconsin, have invented certain new and useful Improvements in Dynamo-Electric Machines, of which the following is a full, clear, and exact specification.

This invention relates to dynamo-electric machines, and more particularly to means for securing in place collector leads connecting the rotary field windings and collector rings of such machines.

In the operation of dynamo-electric machines, and particularly high speed dynamo-electric machines, such as turbo generators, it is necessary to pay particular attention to supporting the various parts of the rotary member. This is particularly true of the collector leads extending between the rotary field winding and collector rings.

It is therefore the object of my invention to securely maintain the collector leads connecting the rotary field winding and collector rings of dynamo-electric machines in a fixed position. This object is accomplished by mounting over the shaft in which the collector lead is preferably located, an annular member into which elements extend to securely clamp the collector leads.

The various novel features of my invention will be apparent from the description and drawings, and will be particularly pointed out in the appended claims.

The invention is illustrated on the accompanying sheet of drawings, in which—

Figure 1 is a fragmentary sectional view of a dynamo-electric machine equipped with my invention; Fig. 2 is a sectional view showing one form of my retaining means and taken along the line 2—2 of Fig. 1; and, Fig. 3 is a front elevation of a dynamo-electric machine in which my invention finds particular commercial application.

The invention finds particular application in the case of high speed turbo generators, one of such machines, 10, being here shown as having a stator which includes a laminated core 11 retained between end plates 12, only one of which is here shown, said core being provided with slots 13 in which windings 14 are located. Supporting this core is the stator housing 15 having end covers 16 inclosing the rotating member 17. This rotating member includes a core 18 carrying a field winding, the end portions 19 of which project beyond the core and are inclosed by end rings 20, only one of which is here shown. Mounted on the shaft 21 of the rotary member are collector rings 22, to each of which is secured a collector lead 23 connecting the rotary field winding and the collector rings.

In order to securely maintain the collector lead 23 in a fixed position under all conditions of operation, particular means have been provided for accomplishing this purpose. The shaft 21 is preferably provided with a slot 24 in which the insulated collector lead 23' is at least partially located. Mounted over the shaft 21 and the collector lead 23 is an annular member 25 having a slot 26 which registers with the slot 24 in the shaft. As here shown, the collector lead 23 occupies the slot 24 in the shaft and also a portion of the slot 26 in the annular retaining member 25. Located over the collector lead 23 and interposed between said collector lead and the annular member 25 within the slot 26, is a bar 27, preferably of steel, which is insulated from the collector lead 23 and pressed against the latter by threaded members or screws 28 located in tapped portions 29 of the annular member 25. The bar or plate 27 may be forced against the collector lead 23 with any degree of tightness, within practical limits, by adjusting the screws 28. Diametrically opposite to these screws 28 is another screw 30 passing through the annular member 25 and projecting into the shaft 21 to retain said annular member in a fixed position. Four screws 28 have been shown passing through the annular member 25 for adjusting the degree of tightness with which the collector lead is held in a fixed position, but any number of screws 28 may be provided to effect the desired result. This retaining means is the same on both ends of the shaft.

There may be various modifications of the precise form and arrangement herein shown and described, and I aim to cover all such modifications which do not depart from the spirit and scope of my invention as set forth in the appended claims.

What I claim as new is:

1. In the rotary member of a dynamo-electric machine, the combination of a shaft having a slot, a core carried by said shaft, a winding carried thereby, a collector ring mounted on said shaft, a collector lead connecting said winding and said collector ring, a portion of said lead being located in said slot, an annular member mounted over said shaft and collector lead and provided with a slot radially alined with the slot in the shaft, and means passing into the slot in said annular member and exerting pressure on said collector lead to retain it in place.

2. In the rotary member of a dynamo-electric machine, the combination of a slotted shaft, a winding rotated by said shaft, a collector ring, a collector lead connecting said winding and said collector ring and located in part in the slotted portion of said shaft, an annular member provided with a slot and mounted over said shaft and said collector lead, the slotted portions of said shaft and annular member registering transversely, and a threaded member extending through said annular member to maintain said collector lead in a fixed position in the slots of the shaft and the annular member.

3. In the rotary member of a dynamo-electric machine, the combination of a shaft having a slot, a winding rotated by said shaft, a collector ring, a collector lead connecting said winding and said collector ring, a member provided with a slot and mounted over said shaft, the slots in the shaft and said member being transversely alined, said collector lead occupying the slots in said shaft and said member, a bar or plate interposed between said member and said collector lead and engaging the latter, and means for pressing said bar or plate against said collector lead to retain it in place.

4. In a dynamo-electric machine, a rotatable element having a slot at its periphery extending in a substantially axial direction, a collector ring mounted on said rotatable element, a sleeve member mounted on said rotatable element in fixed relation thereto and provided with a slot at its inner surface radially alined with the slot in said rotatable element, and a lead connected to said collector ring and disposed along said rotatable element with portions thereof held in fixed position in the slots in said rotatable element and said sleeve.

Milwaukee, Wis., Sept. 25, 1911.

In testimony whereof I affix my signature, in the presence of two witnesses.

CHARLES E. SEARCH.

Witnesses:
  Chas. L. Byron,
  Rob. E. Stoll.

Copies of this patent may be obtained for five cents each, by addressing the "Commissioner of Patents, Washington, D. C."